United States Patent
Yamamura et al.

[11] Patent Number: 6,004,671
[45] Date of Patent: *Dec. 21, 1999

[54] REINFORCEMENT FOR COMPOSITE MATERIAL AND COMPOSITE MATERIAL USING THE SAME

[75] Inventors: Takemi Yamamura, Tokyo; Mitsuhiko Sato, Yamaguchi-ken; Makoto Tamura, Yamaguchi-ken; Shinji Kajii, Yamaguchi-ken; Yasuo Matsumori, Yamaguchi-ken; Yoshikatu Harada, Yamaguchi-ken, all of Japan

[73] Assignee: Research Institute of Advanced Material Gas-Generator, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/372,128

[22] Filed: Jan. 13, 1995

[30] Foreign Application Priority Data

| Jan. 20, 1994 | [JP] | Japan | 6-004673 |
| Mar. 25, 1994 | [JP] | Japan | 6-056358 |
| Mar. 29, 1994 | [JP] | Japan | 6-059489 |

[51] Int. Cl.⁶ ................................................. B32B 9/00
[52] U.S. Cl. ........................ 428/364; 428/368; 428/369; 428/408; 428/902; 428/688; 428/689; 428/698; 428/699; 428/707; 428/367; 428/372; 428/375; 428/241; 428/325; 501/35; 501/38; 501/91; 501/95; 501/99; 501/103
[58] Field of Search ............................. 427/249, 255; 428/368, 364, 369, 408, 902, 688, 684, 698, 699, 702, 367, 372, 375, 241, 325; 501/35, 38, 91, 95, 99, 103

[56] References Cited

U.S. PATENT DOCUMENTS

| 4,399,232 | 8/1983 | Yajima et al. ............... 501/38 |
| 5,139,871 | 8/1992 | Wallace et al. . | |
| 5,198,282 | 3/1993 | Baker et al. . | |

FOREIGN PATENT DOCUMENTS

| 0 290 146 | 11/1988 | European Pat. Off. . |
| 0 291 905 | 11/1988 | European Pat. Off. . |
| 0 417 526 | 3/1991  | European Pat. Off. . |
| 0 434 300 | 6/1991  | European Pat. Off. . |
| 0 496 137 | 7/1992  | European Pat. Off. . |
| 0 538 108 | 4/1993  | European Pat. Off. . |

OTHER PUBLICATIONS

"Reinforced Fiber–III. SiC Fibers", The Journal of the Japan Society of Composite Materials, 1991, vol. 17, No. 1, pp. 24–31.

Kobunshi Shinsozai Binran, Maruzen, Table 7.28 Alumina fiber, 1989, p. 463.

Hyung–Suk Yoon et al., "Interfaclial Reaction of C/Al Composite and Influence of Reaction Product on Its Tensile Strength", 1989, vol. 75, No. 9, pp. 41–48.

Takashi Ishikawa et al., "Strength Properties of Oxidation Resistant Polymer Conversion Composites Reinforced by Si–Ti–C–O Fibers at Ambient and High Temperatures", The 70th JSME Spring Annual Meeting, 1993, pp. 163–165.

Primary Examiner—Richard Weisberger
Attorney, Agent, or Firm—Young & Thompson

[57] ABSTRACT

A reinforcement for composite materials is disclosed, which comprises a number of filaments of inorganic long fiber and glass and/or glass ceramic present in the gaps among the filaments and having a wire or tape form. Also disclosed is a metallic or ceramic composite material composed of a plurality of the reinforcements and a metal or intermetallic compound or ceramic which is present in the gaps among the individual reinforcements.

11 Claims, 1 Drawing Sheet

REINFORCEMENT FOR COMPOSITE MATERIAL AND COMPOSITE MATERIAL USING THE SAME

BACKGROUND OF THE INVENTION

1. Field of the Invention

This invention relates to a reinforcement for composite materials, metallic composite materials, and ceramic composite materials. More particularly, it relates to a reinforcement for composite materials which is useful as a reinforcing material combined with high-temperature-melting titanium alloys or various ceramics to provide metal matrix composites (hereinafter abbreviated as MMC) or ceramic matrix composites (hereinafter abbreviated as CMC), metallic composite materials excellent in heat resistance, corrosion resistance and mechanical properties, and ceramic composite materials excellent in heat resistance, corrosion resistance and mechanical properties.

2. Description of the Prior Art

Various materials having excellent heat resistance and mechanical properties have hitherto been developed for use in the field of aerospace and aircraft. Typical materials proposed include metal matrix composites (MMC) and ceramic matrix composites (CMC).

Composite (1) described below can be mentioned as an example of MMC.

(1) Composite formed by using an α+β type titanium alloy, e.g., Ti—6Al—4V, or α+β type titanium alloy, e.g., Ti—15V—3Cr—3Sn—3Al, as a matrix and SiC/C composite fiber as a reinforcement. The above-mentioned titanium alloys are superior to steel, superalloys or heat-resistant eutectic alloys in specific strength, specific modulus and corrosion resistance and also have a higher working temperature limit (e.g., 723K) than aluminum alloys. The SiC/C composite fiber as referred to above comprises a carbon fiber core having deposited thereon SiC by chemical vapor deposition (CVD). For example, the SiC/C composite fiber produced by Textron Co. is most widely used.

It is reported that composite (1) exhibits high performance owing to the use of SiC/C composite fiber which exerts its full performance as a reinforcement when combined with the above-mentioned titanium alloy (see The Journal of the Japan Society of Composite Materials, Vol. 17, No. 1, p. 25 in pp. 24–31 (1991)).

In case where any other heat-resistant fiber, for example, carbon fiber (e.g., PAN-based or pitchbased carbon fiber), $Al_2O_3$ fiber (e.g., products produced by E. I. du Pont de Nemours & Co., Inc., 3M Co., and Sumitomo Chemical Co., Ltd.), SiC fiber (e.g., "Nicalon", produced by Nippon Carbon Co., Ltd.), Si—Ti—C—O fiber (e.g., "Tyranno Fiber", produced by Ube Industries, Ltd.), Si—C—N-based fiber (e.g., "HPZ Fiber", produced by Dow Corning Corp.) or $Si_3N_4$ fiber (e.g., a product produced by Tonen K. K.) is used as a reinforcement in place of SiC/C,composite fiber, it undergoes considerable reaction with the above-described titanium alloy upon composite molding to a degree varying according to the kind of the fiber. As a result, no reinforcing effect is produced at all or, even if the degree of deterioration by the reaction may be small, substantial reinforcing effects cannot be obtained, so that the resulting composite material fails to display sufficient performance for use in the field of aerospace and aircraft industries.

However, composite (1) involves drawbacks (a) and (b) as follows.

(a) Because the carbon fiber core and the surrounding SiC in the reinforcement are greatly different in coefficient of thermal expansion, the SiC/C fiber has considerably poor thermal fatigue characteristics (resistance to fatigue of repeated alternation of low temperature and high temperature). Therefore, the SiC/C fiber has insufficient reliability for use as a reinforcement in high-temperature structural members.

(b) Because the SiC/C fiber is prepared by CVD, it is so expensive (at least ¥1,000,000/kg) that the application is limited to specific military uses where no consideration of price is required. In the aircraft industry, the cost is a today's problems. Seeing that an acceptable price of reinforcements, the cost of a reinforcements is ¥200,000/kg to ¥300,000/kg at the highest. Thus the SiC/C fiber is impractical.

MMC also includes composite (2) formed by using, as a matrix, an intermetallic compound which is more heat resistant than the titanium alloys used in (1) above, such as $Ti_3Al$, TiAl or $Nb_3Al$, and, as a reinforcement, SiC/C fiber, taking deterioration by reaction on composite molding into consideration as in (1) above.

Under the present situation, however, the SiC/C fiber in composite (2) still involves the problem of deterioration by reaction at the time of preparing a composite, failing to manifest its performance to the degree displayed in composite (1).

MMC so far proposed further includes composites (3) and (4) described below.

(3) Composite formed by using an aluminum alloy (e.g., A6061, A2024 or A1070) as a matrix and SiC/C fiber (e.g., a product of Textron Co.) (see The Journal of the Japan Society of Composite Materials, Vol. 17, No. 1, p. 25 (1991)), $Al_2O_3$ fiber (e.g., a product of Sumitomo Chemical Co., Ltd.) (see Kobunshi Gakkai (ed.), Kobunshi Shinsozai Binran, p. 463, Maruzen (1989)), carbon fiber (e.g., Tetsu no Ko, Vol. 75, No. 9, pp. 41–48 (1989)) or SiC fiber (e.g., "Nicalon", produced by Nippon Carbon Co., Ltd.) (see Kobunshi Gakkai (ed.), Kobunshi Shinsozai Binran, p. 472, Maruzen (1989)) as a reinforcement.

However, composite (3) using SiC/C fiber is disadvantageous in that the reinforcing fiber is expensive and considerably inferior in thermal fatigue characteristics, although high strength in low temperature is obtained. The composite using carbon fiber is disadvantageous in that it does not withstand an oxidizing atmosphere at 200° C. or higher for a long time and has insufficient corrosion resistance due to the conductivity of the fiber. Further, $Al_2O_3$ fiber or SiC fiber reacts with an aluminum alloy, e.g., A6061 or A2024, which is the most practical as a matrix, upon MMC molding and thus suffers from deterioration, failing to exhibit sufficient reinforcing effects. As a result, the mechanical properties of the composite using these fibers are far below the theoretical values (ROM values).

(4) Composite formed by using a magnesium alloy (e.g., ZE41 or AZ91) as a matrix and SiC/C fiber as a reinforcement (see The Journal of the Japan Society of Composite Materials, Vol. 17, No. 1, p. 26 (1991)).

Similarly to composite (3), composite (4) is notably inferior in thermal fatigue characteristics while exhibiting high performance in low temperatures.

MMC composed of a magnesium alloy and inorganic fiber other than SiC/C fiber, such as $Al_2O_3$ fiber or SiC fiber, has also been proposed. However, since a considerable reaction occurs between the fiber and the magnesium alloy in the preparation of MMC to deteriorate the fiber, the fiber cannot exert its full performance.

CMC which has been proposed to date include composites (5) to (8) shown below.

Si—Ti—C—O fiber (e.g., "Tyranno Fiber", produced by Ube Industries, Ltd.) and SiC fiber (e.g., "Nicalon", produced by Nippon Carbon Co., Ltd.) are most widely employed as a reinforcement in conventional CMC because of their heat resistance, oxidation resistance, and performance stability (being mass-produced and commercially available).

(5) Composite formed by using Nicalon as a reinforcement and $Li_2O_3.Al_2O_3.SiO_2$ (LAS-I, glass ceramics) as a matrix (see J. Mater. Sci., Vol. 17, pp. 2371–2383).

(6) Composite formed by using Nicalon 2D fabric (plane weave) as a reinforcement and SiC prepared by chemical vapor impregnation (CVI) (see Am. Ceram. Soc. Bull., Vol. 65, No. 2, pp. 336–338 (1986)).

(7) Composite formed by using Tyranno 3D fabric as a reinforcement and SiC prepared by CVI as a matrix (see The Japan Society of Mechanical Engineers (ed.), The 70th JSME Spring Annal Meeting (I), 1993–3.31 to 4.2, pp. 163–166).

(8) Composite formed by using Tyranno fiber as a reinforcement and glass ceramics (i.e., the abovementioned LAS, $BaO—MgO—Al_2O_3.SiO_2$ or $CaO—Al_2O_3.SiO_2$) as a matrix.

Composites (5) to (8) above described have the following characteristics.

Composite (5) as a unidirectionally (0°) reinforced composite has a maximum bending strength of 900 MPa and an extremely high $K_{IC}$ (fracture toughness value) in the range of from 17 to 25 MPa√m (the $K_{IC}$ of general SiC moldings is 3 to 5 MPa√m and that of general $Si_3N_4$ moldings is 7 to 9 MPa√m).

Composite (6) has an extremely high $K_{IC}$ of about 27 MPa √m.

The $K_{IC}$ of composite (7) is still higher than that of composite (6) and is estimated to be 50 MPa m or higher from the stress strain curve in tensile strength measurement. The tensile strength of composite (7) is 400 MPa, which is double that of composite (6) (200 MPa). Taking the three-dimensional structure (3D) and the fiber volume fraction (Vf) of 40 vol % into account, the above $K_{IC}$ value is approximate to a theoretical value (i.e., fiber strength 3000 MPa/3×0.4=400 MPa).

Composite (8) exhibits markedly improved strength as compared with composite (1).

Nevertheless, composites (5) to (8) have the following disadvantages.

In composite (5), since Nicalon and LAS has slightly reacted in the preparation of CMC, the strength is lower than the theoretical value (ROM: 1400 to 1500 MPa in this case) obtained from the mechanical property of the fiber and fiber volume fraction (Vf) in CMC.

In composite (6), the fiber is embrittled due to too strong bonding between Nicalon and SiC so that the composite has a bending strength of 300 to 400 MPa and a tensile strength of 200 MPa, which are fairly lower than the theoretical values (max. 1200 MPa).

The oxidation-resistant temperature of composites (5) and (6) is from 1000 to 1200° C. and that of composites (7) and (8) is from 1200 to 1300° C. Composites (5) to (8) are therefore unsatisfactory in terms of heat resistance and oxidation resistance demanded as an advanced material withstanding the extreme conditions in the future aerospace and aircraft industry.

Development of CMC using a matrix other than the glass ceramics or SiC formed by CVI with having a high porosity as used in composites (5) to (8), i.e., $Si_3N_4$ excellent in corrosion resistance or highly heat-resistant SiC formed by ordinary sintering, has been awaited. However, production of CMC using $Si_3N_4$ or SiC as a matrix needs a high temperature (e.g., 1600 to 2100° C.) in sintering, and that causes remarkable deterioration of inorganic fiber due to the induced reaction. For example, Nicalon used as a reinforcement loses its fiber shape completely during molding in the production of the above-described CMC. The same problem also occurs in the case of using SiC/C composite fiber, $Al_2O_3$ fiber, $Si_3N_4$ fiber or Si—C—N fiber as a reinforcement. In using Tirano fiber as a reinforcement, the fiber shape can be retained to show reinforcing effects to some extent, but the strength reached is far from the CMC theoretical value (ROM value).

Hence, the conventionally proposed MMC and CMC do not satisfy the conditions of heat resistance, corrosion resistance, mechanical properties, and the like which are required in the field of aerospace aircraft industries because the fiber reinforcement reacts with the matrix in the production of these composite materials and also the composites themselves are inferior in thermal fatigue characteristics, heat resistance, and oxidation resistance. It has therefore been demanded to develop a reinforcement which is free from the above-mentioned disadvantages and sufficiently exhibits heat resistance, mechanical properties, or the like performance.

Further, the conventional reinforcement, when used at a low Vf, tends to be hard to disperse in a matrix uniformly, causing dispersion unevenness, to provide a composite with uneven strength. Such being the case, the reinforcement cannot help but be used in an amount over the specification, resulting in increased production cost. If the Vf is high, cases are sometimes met with, in which individual fibers come into contact with each other, failing to provide a composite having desired properties, such as mechanical strength.

SUMMARY OF THE INVENTION

Accordingly, an object of the present invention is to provide a novel reinforcement for composite materials which is suitable as a reinforcement for MMC comprising a titanium alloy, an intermetallic compound, etc. as a matrix or CMC comprising highly heat-resistant and high-performance $Si_3N_4$ or SiC obtained by high temperature sintering as a matrix; metallic composite materials excellent in heat resistance, corrosion resistance and mechanical properties; and ceramic composite materials excellent in heat resistance, corrosion resistance and mechanical properties.

The inventors of the present invention have extensively studied in order to solve the aforesaid problems and, as a result, found that the above object of the present invention is accomplished by a reinforcement comprising inorganic long fiber and glass and/or glass ceramic; a metallic composite material using the reinforcement; and a ceramic composite material using the reinforcement.

The present invention has been reached based on this finding, and provides a reinforcement for composite materials, which is characterized by being composed of a bunch of filaments of inorganic long fiber and glass and/or glass ceramic which is present in the gaps among individual filaments is also characterized by having a wire or tape form.

The present invention further provides a metallic composite material composed of a plurality of reinforcements and a metal or intermetallic compound which is present in the gaps among the individual reinforcements, the reinforcements being characterized by each comprising a number of filaments of inorganic long fiber and glass and/or glass ceramic which is present in the gaps among individual filaments and is also characterized by having a wire or tape form.

The present invention furthermore provides a ceramic composite material composed of a plurality of reinforcements and a ceramic which is present in the gaps among the individual reinforcements, the reinforcement being characterized by comprising a number of filaments of inorganic long fiber and glass and/or glass ceramic which is present in the gaps among individual filaments and is also characterized by having a wire or tape form.

The reinforcements for composite materials according to the present invention are suitable for MMC using a titanium alloy, an intermetallic compound, etc. as a matrix and CMC using highly heat-resistant and high-performance $Si_3N_4$ or SiC obtained by high temperature sintering as a matrix.

Since the inorganic fiber in the reinforcement is protected by glass and/or glass ceramic serving as a matrix in the reinforcement, the reinforcement shows excellent performance when combined with a high-melting titanium alloy or various ceramics in the preparation of metal matrix composites (MMC) or ceramic matrix composites (CMC).

That is, with the inorganic fiber being protected with glass ceramic, etc. which has low reactivity with metals, the inorganic fiber is prevented from deterioration due to reaction with a metal when combined with a high-melting metal matrix to thereby obtain MMC having desired mechanical properties.

The preparation of inorganic fiber-reinforced ceramics, typically silicon nitride or silicon carbide, involves heating at 1500° C. or higher for sintering of the ceramic. Since the reinforcing inorganic fiber of the reinforcement of the present invention is previously buried in glass ceramic, etc., it does not suffer from deterioration by such a high temperature to thereby provide CMC with excellent mechanical properties.

Protected against deterioration by reaction, the reinforcement of the present invention provides composite materials exhibiting mechanical properties approximate to the ROM values. Compared with SiC/C composite fiber, the reinforcement of the present invention involves virtually no difference in thermal expansion coefficient among its constituent components so that it is free from fatigue of heat cycle and it can be produced at a markedly reduced cost.

The reinforcement for composite materials according to the present invention achieves strength approximate to the ROM values even with the fiber volume fraction varying over a broad range. Since the filament volume fraction in the reinforcement can be controlled arbitrarily, composite materials endowed with desired characteristics can be obtained irrespective of whether the fiber volume fraction may be low or high, which has given rise to a problem in the conventional reinforcements.

The metallic composite materials according to the present invention are excellent in heat resistance, corrosion resistance and mechanical properties.

That is, when a metal or an intermetallic compound as a high-melting metallic matrix is combined with the above-described reinforcement, the inorganic fiber of the reinforcement is protected by glass ceramic, etc. having low reactivity with a metal and thereby prevented from deterioration by reaction with a metal. As a result, the metallic composite material of the present invention using the reinforcement possesses desired mechanical properties.

Further, since the fiber deterioration due to reaction during molding is almost completely inhibited, the metallic composite shows mechanical properties approximate to the ROM values. Compared with SiC/C composite fiber, the reinforcement used in the metallic composite material involves virtually no difference in thermal expansion coefficient among its constituent components so that the composite material is free from fatigue of heat cycle and it can be produced at a markedly reduced cost.

Since the reinforcement achieves strength approximate to the ROM values even with the fiber volume fraction varying over a broad range, and the filament volume fraction in the reinforcement can be controlled arbitrarily, the composite material endowed with desired characteristics can be obtained irrespective of whether the fiber volume fraction may be low or high, which has given rise to a problem in the case of using conventional reinforcements.

Therefore, the composite material of the present invention is useful as a material in the field of aerospace and aircraft industries.

The ceramic composite material according to the present invention is excellent in heat resistance, corrosion resistance, and mechanical properties.

Even when the ceramic matrix is sintered at a temperature of 1500° C. or higher in the preparation of inorganic fiber-reinforced ceramic composite material, since the reinforcing inorganic fiber of the reinforcement is previously buried in glass ceramic, etc., it does not suffer from deterioration by such a high temperature. As a result, the ceramic composite material of the present invention exhibits excellent mechanical properties.

Further, since the fiber deterioration due to reaction during molding is almost completely inhibited, the ceramic composite shows mechanical properties approximate to the ROM values. Compared with SiC/C composite fiber, the reinforcement used in the ceramic composite material involves virtually no difference in thermal expansion coefficient among its constituent components so that the composite material is free from fatigue of heat cycle and it can be produced at a markedly reduced cost.

Since the reinforcement achieves strength approximate to the ROM values even with the fiber volume fraction varying over a broad range, and the filament volume fraction in the reinforcement can be controlled arbitrarily, the composite material endowed with desired characteristics can be obtained irrespective of whether the fiber volume fraction may be low or high, which has given rise to a problem in the case of using conventional reinforcements.

Therefore, the ceramic composite material of the present invention is useful as a material in the field of aerospace and aircraft industries.

DETAILED DESCRIPTION OF THE INVENTION

The reinforcement for composite materials according to the present invention will be described below in detail.

The reinforcement for composite materials (hereinafter simply referred to as a "reinforcement") of the present invention is characterized by being composed of a number of inorganic long fiber filaments and glass and/or glass ceramic existing in the gaps among the filaments and also characterized by having a specific shape.

The inorganic long fiber which can be used in the present invention includes (1) inorganic long fibers comprising silicon (Si), titanium (Ti) and/or zirconium (Zr), carbon (C) and oxygen (O). Preferred examples of inorganic long fibers (1) are (a) an amorphous substance substantially comprising Si, Ti and/or Zr, C, and O, (b) an aggregate of the above-mentioned amorphous substance and a crystalline substance having a size of not more than 10000 Å and comprising β-SiC and TiC and/or ZrC, and (c) a mixed system of the above-mentioned crystalline substance and an amorphous substance which is present in the vicinities of the crystalline substance and comprises SiOx and TiOx and/or ZrOx ($0<x\leq 2$).

The term "in the vicinities of" as used in (c) above preferably means the area not more than 1000 Å away from the boundary of the crystalline substance.

The above-illustrated inorganic long fibers (1) preferably have an elemental composition of Si: 30 to 80 wt %; Ti and/or Zr: 0.05 to 8 wt %; C: 15 to 69 wt %; and O: 0.1 to 20.0 wt .

The inorganic long fiber which can be used also includes (2) inorganic long fibers comprising silicon (Si) and carbon (C). Preferred examples of inorganic long fibers (2) are (a) an amorphous substance substantially comprising Si and C, (b) a crystalline substance of β-SiC having a size of not more than 10000 Å, (c) a mixed system of the above-mentioned amorphous substance and the above-mentioned crystalline substance, and (d) a mixed system of the above- mentioned amorphous substance and/or the above-mentioned crystalline substance and a carbon aggregate.

The above-illustrated inorganic long fibers (2) preferably have an elemental composition of Si: 30 to 80 wt %; C: 20 to 70 wt %; and H: not more than 2 wt %.

The inorganic long fiber further includes (3) inorganic long fibers comprising silicon (Si), carbon (C), and oxygen (O). Preferred examples of inorganic long fibers (3) are (a) an amorphous substance substantially comprising Si, C, and O and (b) an aggregate comprising an aggregate of a crystalline substance of β-SiC and amorphous $SiO_2$, the crystalline substance of β-SiC having a size of not more than 10000 Å.

The above-illustrated inorganic long fibers (3) preferably have an elemental composition of Si: 30 to 80 wt %; C: 10 to 65 wt %; O: 0.05 to 25 wt %; and H: not more than 2 wt %.

The inorganic long fiber furthermore includes (4) inorganic long fibers comprising silicon (Si), nitrogen (N), oxygen (O), carbon (C), hydrogen (H), and at least one metal (M) selected from the group consisting of the elements belonging to Groups II to VIII of the Periodic Table. Preferred examples of inorganic long fibers (4) are those comprising Si, N, O, C, H, and at least one metal (M) selected from the group consisting of the elements belonging to Groups II to VIII of the Periodic Table and having an X-ray small angle scattering intensity ratio of from 1 to 20 at a scattering angle of either 1° or 0.5°.

The above-illustrated inorganic long fibers (4) preferably have an N/Si atomic ratio of 0.3 to 3, an O/Si atomic ratio of not more than 15, a C/Si atomic ratio of not more than 7, an H/Si atomic ratio of not more than 1, and an M/Si atomic ratio of not more than 5.

The inorganic long fiber additionally includes (a) an aggregate of crystallines of mullite substantially comprising Al, Si, B, and O and/or (b) an aggregate of crystallites of γ- and η- and alumina and amorphous $SiO_2$.

The individual inorganic long fibers preferably have a structure with a gradient composition in such a manner that the outermost layer comprises 35 to 100 wt % of C, 0 to 60 wt % of Si, 0 to 4 wt % of Ti, and 0 to 19 wt % of 0 and the composition of C, Si, Ti, and O continuously changes from the outermost layer to the inside 20 to 20000 Å deep from the surface layer.

The gradient of the composition in such a structure may draw a straight line or a curved line or a mixed line thereof as long as the change of the composition is continuous.

The inorganic long fiber filament preferably has an average diameter of from 5 to 200 μm, and the number of the filaments in one reinforcement is preferably at least 5 and 6000 at the most.

The shape of the filament includes a column, a hollow column, a prism, a hollow prism and the like.

The filament can easily be obtained by forming the above-described inorganic long fiber in a known manner.

The filament usually has a density of from 1.9 to 4.0 g/cm³.

The glass which can preferably be used in the present invention includes $B_2O_3.SiO_2$-based glass and $MgO.CaO.Al_2O_3.SiO_2$-based glass.

The glass ceramic which can preferably be used in the present invention include $Li_2O.Al_2O_3.MgO.SiO_2.Nb_2O_5$-based ceramics, $MgO.Al_2O_3.SiO_2$-based ceramics, $BaO.Al_2O_3.SiO_2$-based ceramics, $BaO.MgO.Al_2O_3.SiO_2$-based ceramics, and $CaO.Al_2O_3.SiO_2$-based ceramics.

The above-mentioned glass or glass ceramics may further contain a Group II metal oxide, a Group III metal oxide, a group IV metal oxide and/or a group V metal oxide.

The glass or glass ceramics usually has a density of from 2.0 to 3.8 g/cm³.

The glass ceramics preferably comprises an amorphous substance having the above-mentioned composition and/or a crystalline substance the main crystal phase of which comprises Anorthite, β-Spodumene, Cordierite, Barium Osumilite, Mullite or celsian.

The volume fractions of the inorganic long fiber filament and the glass and/or glass ceramics in the reinforcement of the present invention are from 20 to 90 vol % and from 10 to 80 vol %, respectively.

If desired and for preference, the reinforcement of the present invention has a relaxing layer for various impacts (hereinafter referred to as an impact relaxing layer) on the interface between each filament and the metal compound oxide.

The impact relaxing layer preferably comprises at least one of carbon and carbide-, nitride- or boride-based ceramics, e.g., carbon, SiC, $Si_3N_4$, $TiB_2$, TiN, TiC, BN, TiC.TiN, etc., and has a thickness of from 5 to 20000 Å.

The volume fraction of the impact relaxing layer is preferably not more than 10 vol %.

Figure 1:
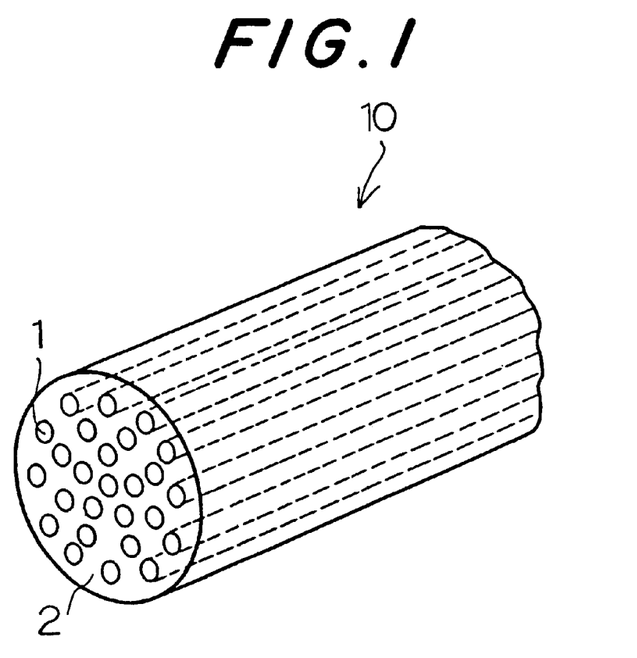
FIG. 1 is a partial perspective view of an example of the reinforcement for composite materials according to the present invention.
Figure 2:
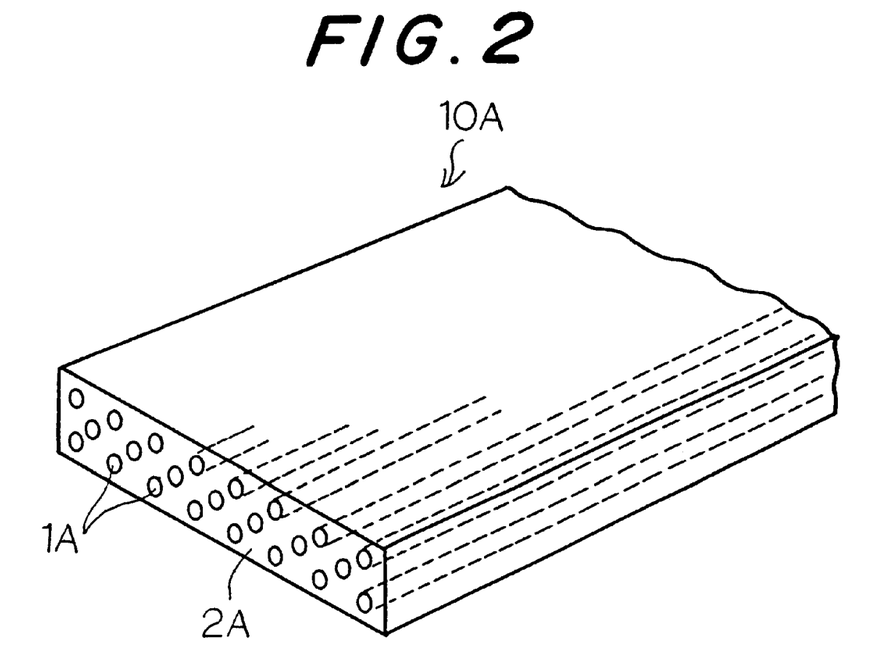
FIG. 2 is a partial perspective view of another example of the reinforcement for composite materials according to the present invention.

The reinforcement of the present invention is now illustrated by referring to FIGS. 1 and 2.

FIG. 1 is a partial perspective view of an example of the reinforcement according to the present invention, and FIG. 2 is a partial perspective view of an another example of the reinforcement according to the present invention.

Reinforcement 10 shown in FIG. 1 is composed of a number of column-shaped inorganic long fiber filaments 1 and glass and/or glass ceramics 2 existing among filaments 1 and has a form of wire.

In more detail, filaments 1 form a bunch with the gaps among individual filaments 1 being filled with glass and/or glass ceramics 2, and glass and/or glass ceramics 2 also forms the outer shape of reinforcement 10 to provide a wire shape.

Reinforcement 10A shown in FIG. 2 is composed of a number of column-shaped inorganic long fiber filaments 1A and glass and/or glass ceramics 2a which is present in the gaps among individual filaments and has a form of tape.

Filaments 1A form a bunch with the gaps among themselves being filled with glass and/or glass ceramics 2A, and glass and/or glass ceramics 2A also forms the outer shape of reinforcement 10A to provide a tape shape.

As is shown in FIGS. 1 and 2, the reinforcement of the present invention itself is formed of a composite material composed of inorganic fiber and a glass and/or glass ceramics matrix and has a form of wire or tape.

The wire-shaped reinforcement preferably has a diameter of 20 $\mu$m to 5 mm, and the tape-shaped one preferably has a width of 20 $\mu$m to 10 cm and a thickness of 10 $\mu$m to 1 cm.

The method for preparing the reinforcement of the present invention is described below.

The reinforcement of the present invention can be obtained by, for example, conducting the following steps 1 to 6 successively.

Step 1: A step of removing an organic sizing agent from inorganic long fiber.

Step 2: A step of opening the inorganic long fiber from which the organic sizing agent has been removed as obtained in step 1 (filamentation).Step 3: A step in which the opened inorganic long fibers are passed through an aqueous and/or organic solvent slurry containing glass and/or glass ceramics to adhere the glass and/or glass ceramics to the individual inorganic long fibers.

Step 4: A step in which the inorganic long fibers having adhered thereon the glass and/or glass ceramics as obtained in step 3 are shaped into wire or tape by passing them through a slit or a pair of rollers.

Step 5: A step in which the wire-shaped or tape-shaped inorganic long fibers having adhered thereto glass and/or glass ceramics are continuously calcined to melt sinter the glass and/or glass ceramics.

Step 6: A step in which the inorganic fibers/glass and/or glass ceramic melt sinter as obtained in step 5 is further calcined thereby to crystallize a part or the whole of a metal oxide melt sinter and the sinter is continuously winded.

The organic sizing agent to be removed in step 1 includes polyethylene oxide and vinyl acetate.

The filamentation in step 2 can be carried out by, for example, utilizing an air flow. The air flow preferably has a flow rate of 1 cm/sec to 100 cm/sec and an air pressure of 0.1 to 5 kg/cm2.

In step 3, the slurry may contain a binder for fiber sizing so as to enhance the adhesion of glass and/or glass ceramic to the fibers. The binder for fiber sizing to be used includes polyethylene oxide and vinyl acetate. The glass and/or glass ceramic concentration in the aqueous and/or organic solvent slurry preferably ranges from 1 to 80 wt %, and the concentration of the binder for fiber sizing is preferably from 0.1 to 50 wt %.

The slit which may be used in step 4 preferably has a diameter of 20 $\mu$m to 5 mm and a width of 8 $\mu$m to 1 cm. The rollers which may be used in step 4 preferably include those made of materials to which the glass and/or glass ceramic slurry hardly adheres, such as metals, plastics, rubber or ceramics. In using a slit, a wire- or tape-shaped reinforcement is obtained. In using rollers, a tape-shaped reinforcement is obtained.

The calcination in step 5 is preferably effected at a temperature of from 500 to 1700 °C. for a period of from 30 seconds to 3 hours.

The calcination in step 6 is preferably performed at a temperature of from 700 to 1900° C. for a period of from 10 minutes to 500 hours.

The reinforcement having the aforesaid impact relaxing layer can be obtained by using inorganic long fiber having been previously coated with the above-described impact relaxing layer in step 1.

The reinforcement according to the present invention can be used in various composites, such as metal matrix composites (MMC) or ceramic matrix composites (CMC). The composites using the reinforcement of the present invention can be produced in a conventional manner.

The metallic composite materials according to the present invention are described below in detail.

The metal or intermetallic compound which can be used in the metallic composite material of the present invention forms a matrix of the composite material. Useful metals include titanium alloys, such as Ti—6Al—4V ($\alpha+\beta$ type) and Ti—15V—3Cr—3Sn—3Al ($\beta$ type), aluminum alloys, such as A6061 and A2024, and magnesium alloys, such as AZ91 and ZE41. Useful intermetallic compounds include $Ti_3Al$, TiAl and $Nb_3Al$.

Titanium alloys such as $Ti_3Al$, TiAl, and Ti—6Al—4V ($\alpha+\beta$ type) are particularly preferred in the present invention.

The metal or intermetallic compound may have a powder form, a foil form, a plate form or a mass form. Those commercially available may be used, or they may be prepared in a conventional manner.

It is preferable that the volume fractions of the reinforcement and the matrix, i.e., metal or intermetallic compound, in the metallic composite material are 20 to 80 vol % and 80 to 20 vol %, respectively. The volume fractions of these components are selected appropriately according to performance requirements based on the structural design of the product or part to which the composite material is applied.

The densities of the reinforcement and the metal or intermetallic compound in the metallic composite material are from 1.9 to 4.0 $g/cm^3$ and from 1.7 to 7.3 $g/cm^3$, respectively.

A mode of reinforcement (a mode of orientation) in the metallic composite material includes unidirectional reinforcement, bi- or polydirectional reinforcement at an angle of 0°, 90°, etc., and reinforcement using fabric made of small diameter reinforcements containing a small number of filaments into various structures, such as plane weave, satin weave, cord fabric, planar triaxial weave, three-dimensional fabric, and braid.

In particular, in order to draw the full characteristics of the metallic composite material of the present invention, for example, in application to the field of aerospace and aircraft industries, the abovementioned modes of orientation are preferably adopted according to the performance requirements on the basis of design. In this application, the volume fractions of the reinforcement and the metal or intermetallic compound are preferably from 40 to 70 vol % and from 30 to 60 vol %, respectively.

If desired and for preference, the metallic composite material of the present invention may have an impact relaxing layer resistant to various impacts on the interface between the reinforcement and the metal or intermetallic compound matrix.

The impact relaxing layer preferably comprises at least one of carbon, carbide-, oxide-, nitride- or boride-based ceramics, and metals, e.g., carbon, SiC, $ZrO_2$, $Si_3N_4$, BN, TiN, TiC, $TiB_2$, Ta, Zr, and Hf, and preferably has a thickness of from 5 to 10000 Å.

The volume fraction of the impact relaxing layer is preferably not more than 10 vol %.

The metallic composite material of the present invention can be obtained from the above-mentioned reinforcement and metal or intermetallic compound in accordance with well-known methods. While not limiting, useful methods include a plasma spray coating-hot press method, a plasma spray coating-diffusion coating method, a squeeze casting method, a die casting method, a powder solidification method, and a dip coating method.

The metallic composite material having the aforesaid impact relaxing layer can be obtained by using a reinforcement having been previously coated with the above-described impact relaxing layer.

The ceramic composite materials according to the present invention are described below in detail.

The ceramic which can be used in the ceramic composite material of the present invention forms a matrix of the composite material. Useful ceramics include carbides, such as SiC, TiC, $B_4C$, TaC, and WC; nitrides, such as $Si_3N_4$, BN, TiN, and AlN; borides, such as $TiB_2$ and MoB; silicides, such as $MoSi_2$; and oxides different from the glass and/or glass ceramic, such as $Al_2O_3$, $ZrO_2$, and MgO. These ceramics may be used either individually or as a combination thereof.

In the present invention, SiC, TiC, $B_4C$, $Si_3N_4$, BN, $TiB_2$, $Al_2O_3$, $ZrO_2$, and MgO are preferred.

The ceramic to be used may be selected from ceramic powder usually having a diameter of not more than 1 Am and those prepared in a conventional manner. As is hereinafter described with reference to processes of producing ceramics, a commercially available organometallic polymer capable of being converted to ceramic on pyrolysis may also be used after being converted to ceramic by pyrolysis. Such an organometallic polymer includes polysilazane, polycarbosilane, polytitanocarbosilane, and boron-containing organosilicon polymers. In addition, ceramics obtained by conversion of a commercially available starting gas, such as an organometallic gas, a metal halide, a hydrocarbon gas, ammonia gas, nitrogen gas or hydrogen gas, by chemical vapor deposition, chemical vapor impregnation or chemical vapor penetration can also be employed. Useful starting gas includes methane, ammonia, hydrogen, silane, borane, and silicon tetrachloride.

It is preferable that the volume fractions of the reinforcement and the ceramic matrix in the ceramic composite material are 5 to 80 vol % and 20 to 95 vol %, respectively. The volume fractions of these components are selected appropriately according to performance requirements based on the structural design of the product or part to which the composite material is applied.

The densities of the reinforcement and the ceramic matrix in the ceramic composite material are from 1.9 to 3.8 $g/cm^3$ and from 2.2 to 7.2 $g/cm^3$, respectively.

A mode of reinforcement (a mode of orientation) in the ceramic composite material includes unidirectional reinforcement, bi- or polydirectional reinforcement at an angle of 0°, 90°, etc., and reinforcement using fabric made of small diameter reinforcements containing a small number of filaments into various structures, such as plane weave, satin weave, cord fabric, planar triaxial weave, three-dimensional fabric, and braid.

In particular, in order to draw the full characteristics of the ceramic composite material of the present invention, for example, in application to the field of aerospace and aircraft, the above-mentioned modes of orientation are preferably adopted according to the performance requirements on the basis of design. In this application, the volume fractions of the reinforcement and the ceramic are preferably from 40 to 70 vol % and from 30 to 60 vol %, respectively.

If desired and for preference, the ceramic composite material of the present invention may have an impact relaxing layer resistant to various impacts on the interface between the reinforcement and the ceramic matrix.

The impact relaxing layer preferably comprises at least one of carbon, carbide-, oxide- or nitride-based ceramics, and metals, e.g., carbon, SiC, $ZrO_2$, $Si_3N_4$, BN, TiN, TiC, $TiB_2$, Ta, Zr, and Hf, and preferably has a thickness of from 5 to 20000 Å.

The volume fraction of the impact relaxing layer is preferably not more than 30 vol %.

The ceramic composite material of the present invention can be obtained from the above-mentioned reinforcement and ceramic matrix in a conventional manner, for example, the following methods (1) to (3):

(1) A method comprising unidirectionally arranging reinforcements using an easily pyrolyzable binder, such as polyethylene oxide or polyethylene glycol, to prepare prepreg sheets, alternately laminating the prepreg sheets and powdered ceramic, and subjecting the laminate to hot pressing, or cold molding followed by sintering under normal pressure, or HIP molding.

(2) A method comprising passing or soaking the reinforcements through or in a mixed suspension of the above-described binder and ceramic powder in water or a solvent, unidirectionally arranging the reinforcements having adhered thereon the binder and ceramic powder to prepare prepreg sheets, laminating the prepreg sheets, and subjecting the laminate to hot pressing, or cold molding followed by sintering under normal pressure, or HIP molding.

(3) A method comprising preparing preform sheets using an organometallic polymer, such as polysilazane, polycarbosilane, polytitanocarbosilane or a boron-containing organosilicon polymer, the reinforcements (or reinforcing fabric) by impregnation or adhesion and molding the preform sheets in the same manner as in methods (1) and (2).

In the hot pressing, cold molding followed by sintering under normal pressure or HIP molding, the optimum temperature for the ceramic material to form a ceramic matrix is usually in the range of from 900 to 2100° C., and the optimum molding pressure is usually from 50 to 1000 $kgf/cm^2$.

DESCRIPTION OF THE PREFERRED EMBODIMENT

The reinforcement for composite materials, metallic composite materials, and ceramic composite materials according to the present invention will now be illustrated in greater detail with reference to Examples, but it should be understood that the present invention is not construed as being limited thereto.

EXAMPLE 1

The following steps 1 to 6 were carried out in the order described by using inorganic long fiber filaments shown below to obtain a wire-shaped reinforcement for composite materials consisting of 10 vol % of amorphous $BaO.MgO.Al_2O_3.SiO_2$ partly comprising Barium Osumilite crystallites as glass ceramics and 90 vol % of the inorganic long fiber. Inorganic long fiber: An aggregate of 1600 filaments/yarn of amorphous inorganic long fiber comprising Si, Ti, C and O. Each filament had a diameter of 11 μm and an elemental composition of Si: 50 wt %; Ti: 2 wt %; C: 30 wt %; and O: 18 wt % in the inside thereof and Si: 0 wt %; Ti: 0 wt %; C: 100 wt %; and O: 0 wt % in the outermost layer thereof, the composition of the outermost layer being continuously changing to that of the inside in the region from the outermost layer up to the depth of 700 Å. The fiber had been sized with 0.5 to 1 wt % of polyethylene oxide.

Step 1: The fiber was continuously heated at 350° C. in air to remove the sizing agent.

Step 2: The fiber was opened into filaments by an air flow.

Step 3: The filaments were passed through a slurry of fine particles of $BaO.MgO.Al_2O_3.SiO_2$ (glass ceramics) which was prepared by ultrasonic dispersion (containing 10 vol % of polyethylene oxide as a fiber sizing agent) to adhere the glass ceramics on the filaments.

Step 4: The filaments having the glass ceramics adhered thereto were passed through a slit to be shaped into wire.

Step 5: The wire was continuously treated at 1000° C. in a nitrogen atmosphere to melt and sinter the glass ceramic adhered to the filaments.

Step 6: The wire was further treated continuously at 1200° C. in nitrogen.

The resulting wire-shaped reinforcement for composite materials had a tensile strength of 2.5 GPa and an elongation at break of 0.20% as measured by a tensile test at 1200° C. in air.

EXAMPLE 2

The following steps 1 to 6 were carried out in the order described by using filaments of inorganic long fiber shown below to obtain a tape-shaped reinforcement for composite materials consisting of 60 vol % of amorphous glass ceramic having the following composition and partly containing β-spodumene crystallites and 40 vol % of that fiber.

Inorganic long fiber: An aggregate of 3200 filaments/yarn of inorganic long fiber comprising an amorphous substances containing Si, Ti, C and O and ultra fine particles of β-SiC and TiC having a particle size of 20 Å. Each filament had a diameter of 11 μm and an elemental composition of Si: 54 wt %; Ti: 2 wt %; C: 32 wt %; and O: 12 wt % in the inside thereof and Si: 42 wt %; Ti: 3 wt %; C: 47 wt %; and O: 8 wt % in the outermost layer thereof, the composition of the outermost layer being continuously changing to that of the inside in the region from the outermost layer up to the depth of 80 Å. The outermost layer of each filament had provided thereon an impact relaxing layer comprising BN by chemical vapor deposition (CVD) to a thickness of 8000 Å. The fiber had been sized with 0.5 to 1 wt % of an epoxy resin.

Step 1: The fiber was continuously heated at 400° C. in air.

Step 2: Filamentation was conducted in the same manner as in Example 1.

Step 3: The filaments were passed through a slurry of fine particles of $Li_2O.Al_2O_3.MgO.SiO_2.Nb_2O_5$ (glass ceramic) containing a trace amount of $ZrO_2$ which was prepared by ultrasonic dispersion (containing 10 vol % of polyethylene oxide as a fiber sizing agent).

Step 4: The filaments were passed through rollers to be shaped into 10 mm wide tape.

Step 5: The tape was melt sintered at 950° C.

Step 6: The tape was further melt sintered continuously at 1100° C.

The resulting tape-shaped reinforcement for composite materials had a tensile strength of 1.4 GPa and an elongation at break of 0.35% as measured by a tensile test at room temperature.

EXAMPLE 3

The following steps 1 to 5 were carried out in the order described by using filaments of inorganic long fiber shown below to obtain a wire-shaped reinforcement consisting of 10 vol % of glass ceramic comprising amorphous $CaO.MgO.Al_2O_3.SiO_2$ partly containing anorthite crystallites and 90 vol % of that fiber. Inorganic long fiber: An aggregate of 500 Å filaments/yarn of inorganic long fiber containing Si, C, O, and H, comprising an aggregate of crystalline-SiC having a size of not more than 500 Å and amorphous $SiO_2$. Each filament had a diameter of 14 μm and an elemental composition of Si: 58.3 wt %; C: 30.4 wt %; O: 11.1 wt %; and H: 0.2 wt % in the inside thereof and had a carbon coat on the surface thereof to a thickness of 130 nm. The fiber had been sized with 0.5 to 1 wt % of polyvinyl alcohol.

Step 1: The fiber was continuously heated at 600° C. to remove the sizing agent.

Step 2: The fiber was passed through a slurry of fine particles of $CaO.MgO.Al_2O_3.SiO_2$ (glass ceramic) which was prepared by ultrasonic dispersion (containing 10 vol % of polyethylene oxide as a fiber sizing agent) to adhere the glass ceramic onto the fiber.

Step 3: The fibers having glass ceramic adhered thereto were passed through a slit to be shaped into wire.

Step 4: The wire was continuously treated at 1100° C. in nitrogen to melt sinter the adhered glass ceramic.

Step 5: The wire was further melt treated continuously at 1300° C. in nitrogen. The resulting wire-shaped reinforcement had a tensile strength of 2.2 GPa and an elongation at break of 0.17% as measured by a tensile test at 1200° C. in air.

EXAMPLE 4

The following steps 1 to 5 were carried out in the order described by using filaments of inorganic long fiber shown below to obtain a tape-shaped reinforcement consisting of 60 vol % of amorphous glass ceramic having a composition shown below and partly containing spodumenecrystallites and 40 vol % of that fiber.

Inorganic long fiber: An aggregate of 500 filaments/yarn of inorganic long fiber containing Si, C, O, and H and comprising an aggregate of β-SiC crystalline having a size of not more than 100 Å and amorphous $SiO_2$. Each filament had an inside elemental composition of Si: 58.3 wt %; C: 30.4 wt %; O: 11.1 wt %; and H: 0.2 wt %, a diameter of 12 to 14 μm, and a carbon coat on the surface thereof to a thickness of 130 nm. The fiber had been sized with 0.5 to 1 wt % of polyvinyl alcohol.

Step 1: The fiber was continuously heated at 400° C. in air.

Step 2: The fibers were passed through a slurry of fine particles of $Li_2O.MgO.Al_2O_3.SiO_2.Nb_2O_5$ (glass ceramic) containing a trace amount of $ZrO_2$ which was prepared by ultrasonic dispersion (containing 10 wt % of polyethylene oxide as a fiber sizing agent).

Step 3: The fibers were passed through rollers to be shaped into 10 mm wide tape.

Step 4: The wire was melt sintered at 950° C.

Step 5: The wire was further heat treated continuously at 1100° C. for melt sintering.

The resulting tape-shaped reinforcement had a tensile strength of 1.2 GPa and an elongation at break of 0.30% as measured by a tensile test at room temperature.

EXAMPLE 5

The following steps 1 to 5 were carried out in the order described by using filaments of inorganic long fiber shown below to obtain a wire-shaped reinforcement consisting of 10 vol % of glass ceramic comprising amorphous $MgO.Al_2O_3.SiO_2$ partly containing cordierite and 90 vol % of that fiber.

Inorganic long fiber: An aggregate of 200 filaments/yarn of inorganic long fiber containing Si, N, C, O, and H and mainly comprising an aggregate of $Si_3N_4$ crystallines having a size of not more than 2000 Å. Each filament had a diameter of 10 to 20 μm and an elemental composition of Si: 59.2 wt %; N: 37.5 wt %; C: 1.5 wt %; O: 1.5 wt %; and H: 0.3 wt % in the inside thereof. The fiber had been sized with 0.5 to 1 wt % of polyvinyl alcohol.

Step 1: The fiber was continuously heated at 600° C. in air to remove the sizing agent.

Step 2: The fibers were passed through a slurry of fine particles of $MgO.Al_2O_3.SiO_2$ (glass ceramic) which was prepared by ultrasonic dispersion (containing 10 vol % of polyethylene oxide as a fiber sizing agent) to adhere the glass ceramic onto the fibers.

Step 3: The fibers having glass ceramic adhered thereto were passed through a slit to be shaped into wire.

Step 4: The wire was continuously treated at 1100° C. in nitrogen to melt sinter the adhered glass ceramic.

Step 5: The wire was further heat treated continuously at 1300° C. in nitrogen.

The resulting wire-shaped reinforcement had a tensile strength of 1.7 GPa and an elongation at break of 0.16% as measured by a tensile test at 1200° C. in air.

EXAMPLE 6

The following steps 1 to 5 were carried out in the order described below by using filaments of inorganic long fiber shown below to obtain a tape-shaped reinforcement consisting of 60 vol % of amorphous glass ceramic having a composition shown below and partly containing glass β-spodumene crystallines and 40 vol % of that fiber.

Inorganic long fiber: An aggregate of 200 filaments/yarn of inorganic long fiber containing Si, N, C, 0, and H and mainly comprising an aggregate of $Si_3N_4$ crystallines having a size of not more than 2000 Å. Each filament had a diameter of 10 to 20 μm and an inside elemental composition of Si: 59.2 wt %; N: 37.5 wt %; C: 1.5 wt %; O: 1.5 wt %; and H: 0.3 wt %. The fiber had been sized with 0.5 to 1 wt % of polyvinyl alcohol.

Step 1: The fiber was continuously heated at 600° C. in air.

Step 2: The fibers were passed through a slurry of fine particles of $Li_2O.MgO.Al_2O_3.SiO_2.Nb_2O_5$ (glass ceramics) containing a trace amount of $ZrO_2$ which was prepared by ultrasonic dispersion (containing 10 vol % of polyethylene oxide as a fiber sizing agent).

Step 3: The fibers were passed through rollers to be shaped into 10 mm wide tape.

Step 4: The wire was melt sintered at 950° C.

Step 5: The wire was heat treated continuously at 1100° C. for further melt sintering.

The resulting tape-shaped reinforcement had a tensile strength of 1.0 GPa and an elongation at break of 0.29% as measured by a tensile test at room temperature.

EXAMPLE 7

The following steps 1 to 5 were carried out in the order described below by using filaments of inorganic long fiber shown below to obtain a wire-shaped reinforcement consisting of 10 vol % of amorphous $BaO.MgO.Al_2O_3.SiO_2$ partly containing Barium Osumilite and 90 vol % of that inorganic long fiber.

Inorganic long fiber: An aggregate of 1800 filaments/yarn of inorganic long fiber containing Al, Si, B, and 0 and comprising an aggregate of mullite crystallines and amorphous $SiO_2$. Each filament had a diameter of 10 to 20 μm and had an elemental composition of Al: 37.1 wt %; Si: 18.1 wt %; B: 0.6 wt %; and O: 44.2 wt % in the inside thereof. Each filament had a 100 nm thick BN coat on the surface thereof. The fiber had been sized with 0.5 to 1 wt % of polyvinyl alcohol.

Step 1: The fiber was continuously treated at 600° C. in air to remove the sizing agent.

Step 2: The fibers were passed through a slurry of fine particles of $BaO.MgO.Al_2O_3.SiO_2$ (glass ceramics) which was prepared by ultrasonic dispersion (containing 10 vol % of polyethylene oxide as a fiber sizing agent) to adhere the glass ceramic onto the fibers.

Step 3: The fibers having glass ceramic adhered thereto were passed through a slit to be shaped into wire.

Step 4: The wire was continuously heat treated at 1100° C. in nitrogen to melt sinter the adhered glass ceramic.

Step 5: The wire was further heat treated continuously at 1300° C. in nitrogen.

The resulting wire-shaped reinforcement had a tensile strength of 1.3 GPa and an elongation at break of 0.10% as measured by a tensile test at 1200° C. in air.

EXAMPLE 8

The following steps 1 to 5 were carried out in the order described by using filaments of inorganic long fiber shown below to obtain a tape-shaped reinforcement consisting of 60 vol % of amorphous glass ceramic having a composition shown below and partly containing glass β-spodumene crystallines 40 vol % of that fiber.

Inorganic long fiber: An aggregate of 1800 filaments/yarn of inorganic long fiber containing Al, Si, B and O and comprising an aggregate of γ- or -η alumina crystallines and amorphous $SiO_2$. Each filament had a diameter of 10 to 20 μm and an inside elemental composition of Al: 37.1 wt %; Si: 18.1 wt %; B: 0.6 wt %; and O: 44.2 wt %. Each filament had a 100 nm thick BN coat on the surface thereof. The fiber had been sized with 0.5 to 1 wt % of polyvinyl alcohol.

Step 1: The fiber was continuously heated at 600° C. in air.

Step 2: The fiber was passed through a slurry of fine particles of $Li_2O.MgO.Al_2O_3.SiO_2.Nb_2O_5$ (glass ceramics) containing a trace amount of $ZrO_2$ which was prepared by ultrasonic dispersion (containing 10 vol % of polyethylene oxide as a fiber sizing agent).

Step 3: The fibers were passed through rollers to be shaped into 10 mm wide tape.

Step 4: The wire was melt sistered at 950° C.

Step 5: The wire was further heat treated continuously at 1100° C. for melt sintering.

The resulting tape-shaped reinforcement had a tensile strength of 0.7 GPa and an elongation at break of 0.18% as measured by a tensile test at room temperature.

EXAMPLE 9

The wire-shaped reinforcement for composite materials obtained in Example 1 was cut to lengths of 90 mm and unidirectionally arrayed on an aluminum foil-clad carbon plate to a width of 50 mm.

Atomized TiAl (intermetallic compound) powder having a particle size of 90 to 150 μm was deposited on and between the unidirectionally arrayed wire-shaped reinforcements by vacuum plasma spraying in an argon atmosphere at 20 Torr to obtain a prepreg sheet comprising 65 vol % of the wire-shaped reinforcements and 35 vol % of TiAl.

The resulting prepreg sheets were laminated and hot pressed at 950° C. and 10 MPa for 1 minute to obtain a wire-shaped reinforcement-reinforced intermetallic compound (TiAl) composite material having a length of 90 mm, a width of 50 mm, and a thickness of 6 mm.

The resulting intermetallic compound composite material showed substantially no change in strength from room temperature up to 900° C. in a bending test, giving an average of three-point bending strength of 1.6 GPa.

For comparison, prepregs and a composite material were prepared in the same manner as described above, except for using the inorganic long fiber filaments used in Example 1 in place of the above obtained reinforcements. As a result of bending strength measurement, the three-point bending strength at room temperature was as low as 0.1 to 0.2 GPa. This is due to the reaction between the fiber and TiAl or fiber cutting during the preparation of prepregs by vacuum plasma spraying or the reaction between the fiber and TiAl during hot pressing.

EXAMPLE 10

The wire-shaped reinforcement obtained in Example 1 was cut to lengths of 120 mm and unidirectionally arranged in a rectangular carbon die of split type composed of a top force and a bottom force. The upper, lower and side walls of the die each had several holes through which a molten metal might be injected.

The carbon die containing the reinforcements was preheated at 700° C. for 30 minutes, mounted on a squeeze casting machine, and rapidly set in a mold kept at 400° C. The mold was closed, and a molten aluminum alloy A6061 at 700° C. was pressed into the carbon die by means of a plunger under a pressure of 100 MPa and allowed to spontaneously cool while maintaining that pressure for 40 seconds (squeeze casting method) to obtain a 40 mm wide, 120 mm long and 5 mm thick metallic composite material consisting of 40 vol % of wire-shaped reinforcements and 60 vol % of A6061 matrix.

When the resulting metallic composite material was evaluated by a three-point bending test in the air, the results obtained at 400° C. gave an average of 1.3 GPa, which was equal to that obtained at room temperature.

EXAMPLE 11

The tape-shaped reinforcement obtained in Example 2 was cut to lengths of 60 mm and unidirectionally arranged on an aluminum foil-clad carbon plate to a width of 60 mm.

Atomized powder of an $\alpha+\beta$ type titanium alloy, Ti—6Al—4V, having a particle size of 60 to 90 $\mu$m was deposited on and between the unidirectionally arranged tape-shaped reinforcements by vacuum plasma spraying in an argon atmosphere at 20 Torr to obtain a metallic composite material prepreg sheet comprising 50 vol % of the tape-shaped reinforcements and 50 vol % of the titanium alloy.

The resulting prepreg sheets were laminated at alternate angles of 0° and 90° and hot pressed at 700° C. and 20 MPa for 1 minute to obtain a tape-shaped reinforcement-reinforced metallic composite material having a length of 90 mm, a width of 60 mm, and a thickness of 4 mm.

The resulting metallic composite material had a tensile strength of 0.6 GPa in average at 500° C. in the air.

EXAMPLE 12

The wire-shaped reinforcement obtained in Example 3 was cut to lengths of 90 mm and unidirectionally arranged on an aluminum foil-clad carbon plate to a width of 50 mm.

Atomized TiAl (intermetallic compound) powder having a particle size of 90 to 150 $\mu$m was deposited on and between the unidirectionally arranged wire-shaped reinforcements by vacuum plasma spraying in an argon atmosphere at 20 Torr to obtain a metallic composite material prepreg sheet consisting of 65 vol % of the wire-shaped reinforcements and 35 vol % of TiAl.

The resulting prepreg sheets were unidirectionally laminated and hot pressed at 950° C. and 10 MPa for 1 minute to obtain a wire-shaped reinforcement-reinforced metallic composite material having a length of 90 mm, a width of 50 mm, and a thickness of 6 mm.

The resulting intermetallic compound composite material showed substantially no change in strength from room temperature up to 900° C. in a tensile test, giving an average of tensile strength of 1.3 GPa.

For comparison, prepregs and a composite material were prepared in the same manner as described above (the fiber volume fraction was the same), except for using the inorganic long fiber filaments used in Example 3 in place of the above obtained reinforcements. As a result of bending strength measurement, the tensile strength at room temperature was as low as 0.1 to 0.2 GPa. This is due to the reaction between the fiber and TiAl or fiber cutting during the preparation of prepregs by vacuum plasma spraying or the reaction between the fiber and TiAl during hot pressing.

EXAMPLE 13

The wire-shaped reinforcement obtained in Example 3 was cut to lengths of 120 mm and unidirectionally arranged in a rectangular carbon die of split type composed of a top force and a bottom force. The upper, lower and side walls of the die each had several holes through which a molten metal might be injected.

The carbon die containing the reinforcements was preheated at 700° C. for 30 minutes, mounted on a squeeze casting machine, and rapidly set in a mold kept at 400° C. The mold was closed, and a molten aluminum alloy A6061 at 700° C. was pressed into the carbon die by means of a plunger under a pressure of 100 MPa and allowed to spontaneously cool while maintaining that pressure for 40 seconds (squeeze casting method) to obtain a 40 mm wide, 120 mm long and 5 mm thick metallic composite material consisting of 40 vol % of wire-shaped reinforcements and 60 vol % of A6061.

When the resulting metallic composite material was evaluated by a three-point bending test in the air, the results obtained at 400° C. gave an average three-point bending strength of 1.2 GPa, which was equal to that obtained at room temperature.

EXAMPLE 14

The tape-shaped reinforcement obtained in Example 4 was cut to lengths of 60 mm and unidirectionally arranged on an aluminum foil-clad carbon plate to a width of 60 mm.

Atomized powder of an $\alpha+\beta$ type titanium alloy, Ti—6Al—4V, having a particle size of 60 to 90 $\mu$m was deposited on and between the unidirectionally arranged tape-shaped reinforcements by vacuum plasma spraying in an argon atmosphere at 20 Torr to obtain a metallic composite material prepreg sheet consisting of 50 vol % of the tape-shaped reinforcements and 50 vol % of the titanium alloy.

The resulting prepreg sheets were laminated at alternate angles of 0° and 90° and hot pressed at 700° C. and 20 MPa for 1 minute to obtain a tape-shaped reinforcement-reinforced metallic composite material having a length of 90 mm, a width of 60 mm, and a thickness of 4 mm.

The resulting metallic composite material had a tensile strength of 0.5 GPa in average at 500° C. in the air.

EXAMPLE 15

The wire-shaped reinforcement obtained in Example 5 was cut to lengths of 90 mm and unidirectionally arranged on an aluminum foil-clad carbon plate to a width of 50 mm.

Atomized TiAl (intermetallic compound) powder having a particle size of 90 to 150 μm was deposited on and between the unidirectionally arranged wire-shaped reinforcements by vacuum plasma spraying in an argon atmosphere at 20 Torr to obtain a metallic composite material prepreg sheet consisting of 65 vol % of the wire-shaped reinforcements and 35 vol % of TiAl.

The resulting prepreg sheets were unidirectionally laminated and hot pressed at 950° C. and 10 MPa for 1 minute to obtain a wire-shaped reinforcement-reinforced metallic composite material having a length of 90 mm, a width of 50 mm, and a thickness of 6 mm.

The resulting intermetallic compound composite material showed substantially no change in strength from room temperature up to 900° C. in a tensile test, giving an average of tensile strength of 1.3 GPa.

For comparison, prepregs and a composite material were prepared in the same manner as described above (the fiber volume fraction was the same), except for using the inorganic long fiber filaments used in Example 5 in place of the reinforcements. As a result of bending strength measurement, the tensile strength at room temperature was as low as 0.1 to 0.2 GPa. This is due to the reaction between the fiber and TiAl or fiber cutting during the preparation of prepregs by vacuum plasma spraying or the reaction between the fiber and TiAl during hot pressing.

EXAMPLE 16

The wire-shaped reinforcement obtained in Example 5 was cut to lengths of 120 mm and unidirectionally arranged in a rectangular carbon die of split type composed of a top force and a bottom force. The upper, lower and side walls of the die each had several holes through which a molten metal might be injected.

The carbon die containing the reinforcements was preheated at 700° C. for 30 minutes, mounted on a squeeze casting machine, and rapidly set in a mold kept at 400° C. The mold was closed, and a molten aluminum alloy A6061 at 700° C. was pressed into the carbon die by means of a plunger under a pressure of 100 MPa and allowed to spontaneously cool while maintaining that pressure for 40 seconds (squeeze casting method) to obtain a 40 mm wide, 120 mm long and 5 mm thick metallic composite material consisting of 40 vol % of wire-shaped reinforcements and 60 vol % of A6061.

When the resulting metallic composite material was evaluated by a three-point bending test in the air, the results obtained at 400° C. gave an average three-point bending strength of 1.0 GPa, which was equal to that obtained at room temperature.

EXAMPLE 17

The tape-shaped reinforcement obtained in Example 6 was cut to lengths of 60 mm and unidirectionally arranged on an aluminum foil-clad carbon plate to a width of 60 mm.

Atomized powder of an α+β type titanium alloy, Ti—6Al—4V, having a particle size of 60 to 90 μm was deposited on and between the unidirectionally arranged tape-shaped reinforcements by vacuum plasma spraying in an argon atmosphere at 20 Torr to obtain a metallic composite material prepreg sheet consisting of 50 vol % of the tape-shaped reinforcements and 50 vol % of the titanium alloy.

The resulting prepreg sheets were laminated at alternate angles of 0° C. and 90° C. and hot pressed at 700° C. and 20 MPa for 1 minute to obtain a tape-shaped reinforcement-reinforced metallic composite material having a length of 90 mm, a width of 60 mm, and a thickness of 4 mm.

The resulting metallic composite material had a tensile strength of 0.3 GPa in average at 500° C. in the air.

EXAMPLE 18

The wire-shaped reinforcement obtained in Example 7 was cut to lengths of 90 mm and unidirectionally arranged on an aluminum foil-clad carbon plate to a width of 50 mm.

Atomized TiAl (intermetallic compound) powder having a particle size of 90 to 150 μm was deposited on and between the unidirectionally arranged wire-shaped reinforcements by vacuum plasma spraying in an argon atmosphere at 20 Torr to obtain a reinforced metallic composite material prepreg sheet consisting of 65 vol % of the wire-shaped reinforcements and 35 vol % of TiAl.

The resulting prepreg sheets were unidirectionally laminated and hot pressed at 950° C. and 10 MPa for 1 minute to obtain a wire-shaped reinforcement-reinforced metallic composite material having a length of 90 mm, a width of 50 mm, and a thickness of 6 mm.

The resulting intermetallic compound composite material showed substantially no change in strength from room temperature up to 900° C. in a tensile test, giving an average of tensile strength of 0.9 GPa.

For comparison, prepregs and a composite material were prepared in the same manner as described above (the fiber volume fraction was the same), except for using the inorganic long fiber filaments used in Example 7 in place of the reinforcements. As a result of bending strength measurement, the tensile strength at room temperature was as low as 0.1 to 0.2 GPa. This is due to the reaction between the fiber and TiAl or fiber cutting during the preparation of prepregs by vacuum plasma spraying or the reaction between the fiber and TiAl during hot pressing.

EXAMPLE 19

The wire-shaped reinforcement obtained in Example 7 was cut to lengths of 120 mm and unidirectionally arranged in a rectangular carbon die of split type composed of a top force and a bottom force. The upper, lower and side walls of the die each had several holes through which a molten metal might be injected.

The carbon die containing the reinforcements was preheated at 700° C. for 30 minutes, mounted on a squeeze casting machine, and rapidly set in a mold kept at 400° C. The mold was closed, and a molten aluminum alloy A6061 at 700° C. was pressed into the carbon die by means of a plunger under a pressure of 100 MPa and allowed to spontaneously cool while maintaining that pressure for 40 seconds (squeeze casting method) to obtain a 40 mm wide, 120 mm long and 5 mm thick metallic composite material consisting of 40 vol % of wire-shaped reinforcements and 60 vol % of A6061.

When the resulting metallic composite material was evaluated by a three-point bending test in the air, the results obtained at 400° C. gave an average three-point bending strength of 0.7 GPa, which was equal to that obtained at room temperature.

EXAMPLE 20

The tape-shaped reinforcement obtained in Example 8 was cut to lengths of 60 mm and unidirectionally arranged on an aluminum foil-clad carbon plate to a width of 60 mm.

Atomized powder of an α+β type titanium alloy, Ti—6Al—4V, having a particle size of 60 to 90 μm was deposited on and between the unidirectionally arranged tape-shaped reinforcements by vacuum plasma spraying in an argon atmosphere at 20 Torr to obtain a metallic composite material prepreg sheet consisting of 50 vol % of the tape-shaped reinforcements and 50 vol % of the titanium alloy.

The resulting prepreg sheets were laminated at alternate angles of 0° and 90° and hot pressed at 700° C. and 20 MPa for 1 minute to obtain a tape-shaped reinforcement-reinforced metallic composite material having a length of 90 mm, a width of 60 mm, and a thickness of 4 mm.

The resulting metallic composite material had a tensile strength of 0.3 GPa in average at 500° C. in the air.

EXAMPLE 21

The wire-shaped reinforcement obtained in Example 1 was cut to lengths of 6 cm and unidirectionally arranged using polyethylene oxide as a binder to prepare a prepreg sheet having a polyethylene oxide/reinforcement volume ratio of 1/10. The prepreg sheets and $Si_3N_4$ powder having an average particle size of 0.5 μm and containing 4 wt % of $Y_2P_3$ and 4 wt % of $Al_2O_3$ were alternately laminated in a carbon die, and the laminate was hot pressed at 1750° C. and 500 kgf/cm$^2$ for 30 minutes to obtain a 60 mm long, 30 mm wide and 5 mm thick ceramic composite material consisting of 60 vol % of the reinforcements and 40 vol % of $Si_3N_4$/$Y_2O_3$ $Al_2O_3$.

The resulting ceramic composite material showed substantially no change in strength in a tensile strength test at room temperature up to 1200° C., giving an average tensile strength of 1.5 GPa and an average elongation at break of 0.15%.

For comparison, prepregs and a composite material were prepared in the same manner as described above (the fiber volume fraction was the same), except for using the inorganic long fiber filaments used in Example 1 in place of the reinforcements. The tensile strength of the resulting composite material as measured at room temperature was as low as about 0.3 GPa due to deterioration by the reaction between the fiber and $Si_3N_4$ during hot pressing. The elongation at break was as low as 0.07%.

EXAMPLE 22

The tape-shaped reinforcement prepared in Example 2 was passed through an ethyl alcohol solution of polyethylene glycol having dispersed therein $Al_2O_3$ powder having an average particle size of not greater than 1 μm and dried, whereby the $Al_2O_3$ powder was adsorbed on and between the reinforcements with polyethylene glycol as a binder to obtain a preform sheet. The preform sheet was cut to size of 50 mm in width and 100 mm in length. The cut sheets were laminated and pressed at room temperature under a pressure of 300 kgf/cm$^2$ and then sintered at 1600° C. to obtain a 100 mm long, 50 mm wide and 6 mm thick unidirectionally reinforced ceramic composite material consisting of 30 vol % of the reinforcement and 70 vol % of $Al_2O_3$.

The resulting ceramic composite material had a bending strength of 0.6 GPa at 1000° C. in air and a fracture toughness of 15 MPa√m at that temperature.

EXAMPLE 23

The wire-shaped reinforcements prepared in Example 1, previously coated with SiC to a thickness of 0.2 μm by CVD, were introduced into a xylene solution of polytitanocarbosilane, an organometallic polymer composed of Si, Ti, C, H, and O. The reinforcements were arranged unidirectionally and dried at 140° C. in a nitrogen atmosphere to obtain a 500 mm wide preform sheet having polytitanocarbosilane adsorbed on the reinforcements. The resulting preform sheet was cut to size of 100 mm in width and 100 mm in length, and the cut sheets were laminated at angles of 0°, +45°, 90°, and −45°. The laminate was hot pressed at 1600° C. under a pressure of 400 kgf/cm$^2$ for 1 hour to obtain a 100 mm long, 100 mm wide and 2 mm thick ceramic composite material composed of 70 vol % of the reinforcements and 30 vol % of Si—Ti—C ceramic (a pyrolysis product of polytitanocarbosilane).

The resulting composite material had a tensile strength of 0.75 GPa at 1200° C. in air.

EXAMPLE 24

The wire-shaped reinforcement prepared in Example 3 was cut to lengths of 6 cm, and the cut pieces were unidirectionally arranged using polyethylene oxide as a binder to prepare a prepreg sheet having a polyethylene oxide/reinforcement volume ratio of 1/10.

The prepreg sheets and $Si_3N_4$ powder having an average particle size of 0.5 μm and containing 4 wt % of $Y_2O_3$ and 4 wt % of $Al_2O_3$ were alternately laminated in a carbon die and hot pressed at 1750° C. and 500 kgf/cm$^2$ for 30 minutes to obtain a 60 mm long, 30 mm wide and 5 mm thick ceramic composite material consisting of 60 vol % of the reinforcement and 40 vol % of $Si_3N_4$/$Y_2O_3$.$Al_2O_3$.

The resulting ceramic composite material showed substantially no change in strength in a tensile strength test at room temperature up to 1200° C., giving an average tensile strength of 1.4 GPa and an average elongation at break of 0.13%.

For comparison, prepregs and a composite material were prepared in the same manner as described above (the fiber volume fraction was the same), except for using the inorganic long fiber filaments used in Example 3 in place of the reinforcements. The bending strength of the resulting composite material was as low as about 0.3 GPa due to deterioration by the reaction between the fiber and $Si_3N_4$ during hot pressing. The elongation at break was as low as 0.07%.

EXAMPLE 25

The tape-shaped reinforcement prepared in Example 4 was passed through an ethyl alcohol solution of polyethylene glycol having dispersed therein $Al_2O_3$ powder having an average particle size of not greater than 1 μm and dried, whereby the $Al_2O_3$ powder was adsorbed on and between the reinforcements with polyethylene glycol as a binder to obtain a preform sheet.

The preform sheet was cut to size of 50 mm in width and 100 mm in length. The cut sheets were laminated and pressed at room temperature under a pressure of 300 kgf/ cm² and then sintered at 1600° C. to obtain a 100 mm long, 50 mm wide and 6 mm thick unidirectionally reinforced ceramic composite material consisting of 30 vol % of the reinforcements and 70 vol % of $Al_2O_3$.

The resulting ceramic composite material had an average bending strength of 0.5 GPa at 1000° C. in the air and a fracture toughness of 13 MPa√m at that temperature.

EXAMPLE 26

The wire-shaped reinforcements prepared in Example 3, previously coated with SiC to a thickness of 0.2 μm by CVD, were introduced into a xylene solution of polytitanocarbosilane, an organometallic polymer composed of Si, Ti, C, H, and O. The reinforcements were arranged unidirectionally and dried at 140° C. in a nitrogen atmosphere to obtain a 500 mm wide preform sheet having polytitanocarbosilane adsorbed on the reinforcements.

The resulting preform sheet was cut to size of 100 mm in width and 100 mm in length, and the cut sheets were laminated at angles of 0°, +45°, 90° and −45°. The laminate was hot pressed at 1600° C. under a pressure of 400 kgf/cm² for 1 hour to obtain a 100 mm long, 100 mm wide and 2 mm thick ceramic composite material composed of 70 vol % of the reinforcements and 30 vol % of Si—Ti—C ceramic (a pyrolysis product of polytitanocarbosilane).

The resulting composite material had a tensile strength of 0.6 GPa at 1200° C. in the air.

EXAMPLE 27

The wire-shaped reinforcement prepared in Example 5 was cut to lengths of 6 cm, and the cut pieces were unidirectionally arranged using polyethylene oxide as a binder to prepare a prepreg sheet having a polyethylene oxide/reinforcement volume ratio of 1/10.

The prepreg sheets and $Si_3N_4$ powder having an average particle size of 0.5 μm and containing 4 wt % of $Y_2O_3$ and 4 wt % of $Al_2O_3$ were alternately laminated in a carbon die and hot pressed at 1750° C. and 500 kgf/cm² for 30 minutes to obtain a 60 mm long, 30 mm wide and 5 mm thick ceramic composite material consisting of 60 vol % of the reinforcements and 40 vol % of $Si_3N_4/Y_2O_3.Al_2O_3$.

The resulting ceramic composite material showed substantially no change in strength in a tensile strength test at room temperature up to 1200° C., giving an average tensile strength of 1.2 GPa and an average elongation at break of 0.11%.

For comparison, prepregs and a composite material were prepared in the same manner as described above (the fiber volume fraction was the same), except for using the inorganic long fiber filaments used in Example 5 in place of the reinforcements. The bending strength of the resulting composite material was as low as about 0.3 GPa due to deterioration by the reaction between the fiber and $Si_3N_4$ during hot pressing. The elongation at break was as low as 0.07%.

EXAMPLE 28

The tape-shaped reinforcements prepared in Example 6 were passed through an ethyl alcohol solution of polyethylene glycol having dispersed therein $Al_2O_3$ powder having an average particle size of not greater than 1 μm and dried, whereby the $Al_2O_3$ powder was adsorbed on and between the reinforcements with polyethylene glycol as a binder to obtain a preform sheet.

The preform sheet was cut to size of 50 mm in width and 100 mm in length. The cut sheets were laminated and pressed at room temperature under a pressure of 300 kgf/cm² and then sintered at 1600° C. to obtain a 100 mm long, 50 mm wide and 6 mm thick unidirectionally reinforced ceramic composite material consisting of 30 vol % of the reinforcements and 70 vol % of $Al_2O_3$.

The resulting ceramic composite material had an average bending strength of 0.5 GPa at 1000° C. in the air and a fracture toughness of 13 MPa m at that temperature.

EXAMPLE 29

The wire-shaped reinforcements prepared in Example 5, previously coated with SiC to a thickness of 0.2 μm by CVD, were introduced into a xylene solution of polytitanocarbosilane, an organometallic polymer composed of Si, Ti, C, H, and O. The reinforcements were arranged unidirectionally and dried at 140° C. in a nitrogen atmosphere to obtain a 500 mm wide preform sheet having polytitanocarbosilane adsorbed on the reinforcements.

The resulting preform sheet was cut to size of 100 mm in width and 100 mm in length, and the cut sheets were laminated at angles of 0°, +45°, 90° and −45°. The laminate was hot pressed at 1600° C. under a pressure of 400 kgf/cm² for 1 hour to obtain a 100 mm long, 100 mm wide and 2 mm thick ceramic composite material composed of 70 vol % of the reinforcements and 30 vol % of Si—Ti—C ceramic (a pyrolysis product of polytitanocarbosilane).

The resulting composite material had a tensile strength of 0.75 GPa at 1200° C. in the air.

EXAMPLE 30

The wire-shaped reinforcement prepared in Example 7 was cut to lengths of 6 cm, and the cut pieces were unidirectionally arranged using polyethylene oxide as a binder to prepare a prepreg sheet having a polyethylene oxide/reinforcement volume ratio of 1/10.

The prepreg sheet and $Si_3N_4$ powder having an average particle size of 0.5 μm and containing 4 wt % of $Y_2O_3$ and 4 wt % of $Al_2O_3$ were alternately laminated in a carbon die and hot pressed at 1750° C. and 500 kgf/cm² for 30 minutes to obtain a 60 mm long, 30 mm wide and 5 mm thick ceramic composite material consisting of 60 vol % of the reinforcements and 40 vol % of $Si_3N_4/Y_2O3.Al_2O_3$.

The resulting ceramic composite material showed substantially no change in strength in a tensile strength test at room temperature up to 1200° C., giving an average tensile strength of 1.0 GPa and an average elongation at break of 0.08%.

For comparison, prepregs and a composite material were prepared in the same manner as described above (the fiber volume fraction was the same) , except for using the inorganic long fiber filaments used in Example 7 in place of the reinforcements. The bending strength of the resulting composite material was as low as about 0.3 GPa due to deterioration by the reaction between the fiber and $Si_3N_4$ during hot pressing. The elongation at break was as low as 0.07%.

EXAMPLE 31

The tape-shaped reinforcements prepared in Example 8 were passed through a bath of an ethyl alcohol solution of polyethylene glycol having dispersed therein $Al_2O_3$ powder having an average particle size of not greater than 1 μm and dried, whereby the $Al_2O_3$ powder was adsorbed on and between the reinforcements with polyethylene glycol as a binder to obtain a preform sheet.

The preform sheet was cut to size of 50 mm in width and 100 mm in length. The cut sheets were laminated and pressed at room temperature under a pressure of 300 kgf/cm² and then sintered at 1600° C. to obtain a 100 mm long, 50 mm wide, and 6 mm thick unidirectionally reinforced ceramic composite material consisting of 30 vol % of the reinforcements and 70 vol % of $Al_2O_3$.

The resulting ceramic composite material had an average bending strength of 0.4 GPa at 1000° C. in the air and a fracture toughness of 13 MPa√m at that temperature.

EXAMPLE 32

The wire-shaped reinforcements prepared in Example 7, previously coated with SiC to a thickness of 0.2 μm by CVD, were introduced into a xylene solution of polytitanocarbosilane, an organometallic polymer composed of Si, Ti, C, H, and O. The reinforcements were arranged unidirectionally and dried at 140° C. in a nitrogen atmosphere to obtain a 500 mm wide preform sheet having polytitanocarbosilane adsorbed on the reinforcements.

The resulting preform sheet was cut to size of 100 mm in width and 100 mm in length, and the cut sheets were laminated at angles of 0°, +45°, 90° and −45°. The laminate was hot pressed at 1600° C. under a pressure of 400 kgf/cm² for 1 hour to obtain a 100 mm long, 100 mm wide and 2 mm thick ceramic composite material composed of 70 vol % of the reinforcements and 30 vol % of Si—Ti—C ceramic (a pyrolysis product of polytitanocarbosilane).

The resulting composite material had a tensile strength of 0.5 GPa at 1200° C. in the air.

What is claimed is:

1. A reinforcement for composite materials, comprising:
a number of filaments of inorganic fiber distributed in a matrix of a material selected from the group consisting of glass and glass ceramic,
said reinforcement having a substantially constant cross-sectional shape and extended along a longitudinal axis, substantially all of said filaments being oriented generally parallel to said longitudinal axis,
said inorganic fiber being:
(a) an amorphous substance substantially comprising Si, Zr, C, and O;
(b) an aggregate of said amorphous substance and a crystalline substance having a size of not more than 10000 Å and comprising β-SiC, and at least one of TiC and ZrC; or
(c) a mixed system of said crystalline substance and an amorphous substance which is present in the vicinities of the crystalline substance and comprises SiOx, and at least one of TiOx and ZrOx (0<x≦2),
the inorganic fiber having a elemental composition of Si of from 30 to 80% by weight, Zr of from 0.05 to 8% by weight, C of from 15 to 69% by weight, and O of from 0.1 to 20.0% by weight.

2. The reinforcement for composite materials as claimed in claim 1, wherein said cross-sectional shape is rounded.

3. The reinforcement for composite materials as claimed in claim 1, wherein said cross-sectional shape is circular.

4. The reinforcement for composite materials as claimed in claim 1, wherein said cross-sectional shape is rectangular.

5. The reinforcement for composite materials as claimed in claim 1, wherein the filaments have a density of from 1.9 to 4.0 g/cm³, and the glass or glass ceramics has a density of from 2.0 to 3.8 g/cm³.

6. The reinforcement for composite materials as claimed in claim 1, wherein the filaments have an average diameter of from 5 to 200 μm and the number of the filaments per reinforcement is from 5 to 6000.

7. The reinforcement for composite materials as claimed in claim 1, comprising from 20 to 90 vol % of said filaments and from 10 to 80 vol % of said matrix.

8. A reinforcement for composite materials, comprising:
a number of filaments of inorganic fiber distributed in a matrix of a material selected from the group consisting of glass and glass ceramic,
said reinforcement having a substantially constant cross-sectional shape and extended along a longitudinal axis, substantially all of said filaments being oriented generally parallel to said longitudinal axis,
said inorganic fiber being:
(a) an amorphous substance substantially comprising Si and C;
(b) a crystalline substance of β-SiC having a size of not more than 10000 Å;
(c) a mixed system of said amorphous substance and said crystalline substance; or
(d) a mixed system of at least one of said amorphous substance and said crystalline substance, and a carbon aggregate,
the inorganic fiber having an elemental composition of Si of from 30 to 80% by weight, C of from 20 to 70% by weight, and H of not more than 2% by weight.

9. A reinforcement for composite materials, comprising:
a number of filaments of inorganic fiber distributed in a matrix of a material selected from the group consisting of glass and glass ceramic,
said reinforcement having a substantially constant cross-sectional shape and extended along a longitudinal axis, substantially all of said filaments being oriented generally parallel to said longitudinal axis,
said inorganic fiber being:
(a) an amorphous substance substantially comprising Si, C, and O; or
(b) an aggregate comprising an aggregate of a crystalline substance of β-SiC and amorphous $SiO_2$, the crystalline substance of β-SiC having a size of not more than 10000 Å and amorphous $SiO_2$,
the inorganic fiber having an elemental composition of Si of from 30 to 80% by weight, C of from 10 to 65% by weight, O of from 0.05% to 25% by weight, and H of not more than 2 wt %.

10. A reinforcement for composite materials, comprising:
a number of filaments of inorganic fiber distributed in a matrix of a material selected from the group consisting of glass and glass ceramic,
said reinforcement having a substantially constant cross-sectional shape and extended along a longitudinal axis, substantially all of said filaments being oriented generally parallel to said longitudinal axis,
said inorganic fiber comprising:
Si, N, O, C, H, and at least one metal (M) selected from the group consisting of the elements belonging to Groups II to VIII of the Periodic Table at an N/Si atomic ratio of 0.3 to 3, an O/Si atomic ratio of not more than 15, a C/Si atomic ratio of not more than 7, an H/Si atomic ratio of not more than 1, and an M/Si atomic ratio of not more than 5 and having an X-ray small angle scattering intensity ratio of from 1 to 20 at a scattering angle of either 1° or 0.5°.

11. A reinforcement for composite materials, comprising:

a number of filaments of inorganic fiber distributed in a matrix of a material selected from the group consisting of glass and glass ceramic, said reinforcement having a substantially constant cross-sectional shape and extended along a longitudinal axis, substantially all of said filaments being oriented generally parallel to said longitudinal axis, said inorganic fiber being at least one of:

(a) an aggregate of crystallines of mullite substantially comprising Al, Si, B, and O and;

(b) an aggregate of crystallites of $\gamma$- and $\eta$-alumina and amorphous $SiO_2$.

* * * * *